(12) United States Patent
Gadkari et al.

(10) Patent No.: US 9,054,830 B2
(45) Date of Patent: *Jun. 9, 2015

(54) PASSIVE OPTICAL NETWORK SYSTEM

(71) Applicant: NorthPeak Enterprises, Inc., Menlo Park, CA (US)

(72) Inventors: Ketan Gadkari, San Jose, CA (US); Tom Werner, Livermore, CA (US)

(73) Assignee: NorthPeak Enterprises, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,265

(22) Filed: Apr. 30, 2014

(65) Prior Publication Data

US 2014/0233955 A1    Aug. 21, 2014

Related U.S. Application Data

(63) Continuation of application No. 13/116,320, filed on May 26, 2011, now Pat. No. 8,718,472, which is a continuation of application No. 11/763,802, filed on Jun. 15, 2007, now Pat. No. 7,965,939.

(51) Int. Cl.
| | |
|---|---|
| *H04J 14/02* | (2006.01) |
| *H04N 7/22* | (2006.01) |
| *H04Q 11/00* | (2006.01) |

(52) U.S. Cl.
CPC ......... *H04J 14/0239* (2013.01); *H04J 14/0226* (2013.01); *H04J 14/0227* (2013.01); *H04J 14/0282* (2013.01); *H04J 14/0298* (2013.01); *H04N 7/22* (2013.01); *H04Q 11/0067* (2013.01); *H04J 14/0232* (2013.01); *H04J 14/0247* (2013.01); *H04J 14/0252* (2013.01)

(58) Field of Classification Search
USPC ..................................................... 398/67, 72
See application file for complete search history.

(56) References Cited

U.S. PATENT DOCUMENTS

| 6,577,414 B1 * | 6/2003 | Feldman et al. ............... 398/43 |
| 2002/0018260 A1 | 2/2002 | Kisovec et al. |
| 2002/0076143 A1 * | 6/2002 | Foltzer ............................ 385/24 |
| 2005/0152696 A1 | 7/2005 | Shin et al. |
| 2005/0172328 A1 | 8/2005 | Park et al. |
| 2006/0062579 A1 | 3/2006 | Kim et al. |
| 2006/0182446 A1 * | 8/2006 | Kim et al. ....................... 398/72 |

(Continued)

FOREIGN PATENT DOCUMENTS

| EP | 1235433 | 8/2002 |
| JP | 2003-298532 | 10/2003 |

(Continued)

OTHER PUBLICATIONS

International Search Report, PCT/US2008/067165, Dec. 23, 2008, pp. 1-2.

(Continued)

*Primary Examiner* — Nathan Curs
(74) *Attorney, Agent, or Firm* — King & Spalding

(57) ABSTRACT

A system for providing bi-directional RF services over a point-to-multipoint Passive Optical Network (PON). A system that can transport upstream RF signals generated by devices such as a set top box or a cable modem, through a passive Optical Network while simultaneously supporting downstream RF video and bi-directional base-band services on the PON.

9 Claims, 6 Drawing Sheets

(56) References Cited

U.S. PATENT DOCUMENTS

| | | |
|---|---|---|
| 2008/0063397 A1 | 3/2008 | Hu et al. |
| 2008/0124083 A1 | 5/2008 | Esser et al. |
| 2008/0310842 A1 | 12/2008 | Skrobko |
| 2009/0196611 A1 | 8/2009 | Farmer et al. |

FOREIGN PATENT DOCUMENTS

| | | |
|---|---|---|
| JP | 2005-229580 | 8/2005 |
| KR | 2001-0010203 | 2/2001 |
| KR | 10-2006-0056657 | 5/2006 |
| KR | 10-2007-0051517 | 5/2007 |
| WO | WO 2008/156988 | 12/2008 |

OTHER PUBLICATIONS

Declaration Under 37 C.F.R. 1.131 by Ketan Gadkari and Tom Werner, filed during prosecution of parent U.S. Appl. No. 11/763,802, now U.S. Patent 7,695,939, on Aug. 6, 2010.

\* cited by examiner

PASSIVE OPTICAL NETWORK SYSTEM

RELATED APPLICATIONS

This application is a continuation of U.S. patent application Ser. No. 13/116,320, filed May 26, 2011, entitled "Passive Optical Network System," which is a continuation of U.S. patent application Ser. No. 11/763,802, filed Jun. 15, 2007, entitled "Passive Optical Network System for the Delivery of Bi-Directional RF Services," both of which are hereby incorporated herein by reference in their entirety.

I. FIELD OF THE INVENTION

The invention broadly relates to broadband telecommunications systems and particularly to those employing point-to-multipoint Passive Optical Networks (PON).

II. BACKGROUND

Currently there are broadband service providers deploying point-to-multipoint passive optical network systems to provide voice, data, and video services to customers. There are many point-to-multipoint PON technologies available today including Broadband PON (BPON), Gigabit Ethernet PON (GEPON), and Gigabit PON (GPON). Standards bodies such as the International Telecommunication Union (ITU) and Institute of Electrical and Electronics Engineers (IEEE) have released standards for PON systems.

Systems based on point-to-multipoint passive optical network (PON), (see FIG. 1) generally comprise an Optical Line Terminal (OLT) or Optical Line Termination (OLT) connected via fiber to a 1:n passive optical splitter, which in turn is connected to a plurality of Optical Network Units (ONUs) or Optical Network Terminals (ONTs). Optical Line Terminal and Optical Network Unit is the preferred naming convention for IEEE based PON, Optical Line Termination and Optical Network Terminal is the preferred naming convention in ITU 984.x PON. This invention is independent of the specific PON technology used at the OLT and ONU/ONT. For simplicity this specification will use the term Optical Line Terminal (OLT) and Optical Network Unit (ONU) to represent the typical elements of the PON system. The OLT contains an Optical Transmitter, an optical receiver, and a Wavelength Division Multiplexer (WDM). The Optical Transmitter transmits data downstream to the ONUs on an optical wavelength. The Optical Receiver receives data upstream on an optical wavelength from the ONUs. A Wavelength Division Multiplexer (WDM) is typically used to separate the optical wavelengths.

The ONUs contain an Optical Transmitter which transmits upstream data on an optical wavelength to the OLT, and an Optical Receiver to receive downstream data on an optical wavelength from the OLT. As with the OLT, a WDM is typically used to separate the optical wavelengths. Data is broadcast downstream from the OLT and appears at all ONUs via the optical splitter. In the upstream direction, the ONUs use Time-Division-Multiple-Access (TDMA) to send upstream data to the OLT. Each ONU is assigned a timeslot to send its upstream data to the OLT. This insures that signals from multiple ONUs do not collide at the upstream port of the optical splitter. This type of ONU that operates at two wavelengths will be referred to as a two-wavelength ONU.

The PON systems mentioned above operate at two wavelengths and are typically used to provide data services such as web browsing, Voice over IP (VoIP). and IP video. These services are modulated on optical wavelengths as base-band digital signals and will be referred to from now on as base-band services. In addition to these services, some PON systems also provide an RF video service that is similar to a cable TV service. In a typical scenario, this service includes several RF channels that occupy a RF frequency spectrum from 50 to 870 MHz. Some of these channels are analog video channels that use a modulation technique called Amplitude Modulated Vestigial Side Band (AM-VSB), while some channels are digital channels that use QAM (Quadrature Amplitude Modulation). This RF frequency band comprising analog and digital channels is modulated into an optical carrier at wavelength $\lambda 3$ and inserted into the PON using a WDM as shown in FIG. 2. At the subscriber side, the wavelength is separated using a WDM and converted into RF for distribution within the customer premises. This type of ONU that operates at three wavelengths will be referred to as a three-wavelength ONU.

In the descriptions of various figures, we refer to a two-wavelength ONU or a three-wavelength ONU. In general, these ONUs can also be referred to as multi-wavelength capable ONUs.

The three-wavelength system in FIG. 2 was an improvement over the two-wavelength system shown in FIG. 1 because it gave the system operator the ability to provide another revenue generating service. However, the system in FIG. 2 has certain limitations that prevent the System Operator from providing advanced video services such as Video on Demand (VoD) and Network Digital Video Recorder (Network DVR). These services require a set top box at the customer premises that can communicate upstream the customer's requests such as movie selection, channel selection, pause, fast forward, etc. These upstream RF signals typically occupy a frequency band from 5 to 42 MHz. When the customer activates the set top box, typically via a remote control, to request movies, or to pause a movie that is currently playing, this request is modulated into a RF carrier by the set top box and sent upstream to the set top box controller that processes the request. The system in FIG. 2 is not capable of transporting these types of upstream RF signals.

It will be appreciated that a set top box isn't the only device at the customer premises that can generate upstream RF signals. Upstream RF signals can also be generated by cable modems or other devices that offer other services.

In summary, what is needed is a system that carries upstream RF set top box and cable modem information while simultaneously supporting downstream RF video and bi-directional base-band services on the PON.

III. SUMMARY OF THE INVENTION

Accordingly, the objective of the present system and apparatus is to provide a system that can transport upstream RF signals generated by devices such as a set top box or a cable modem, through a passive Optical Network while simultaneously supporting downstream RF video and bi-directional base-band services on the PON. Such a system can be configured in three ways as described below:

In the first embodiment of the system (see FIG. 3) node 350 operating at optical wavelength $\lambda 4$ is used to transmit upstream RF signals. This signal is de-multiplexed at the central office or hub by a WDM (Wavelength Division Multiplexer) 335 and routed to an RF Optical Receiver. The ONU, which is connected to the node 350 via port 352, is used to provide bi-directional base-band services as well as a downstream RF service.

In the second embodiment of the system (see FIG. 4) node 445 performs the function of both transmitting the upstream RF signals as well as receiving the downstream RF signals. The ONU that is connected to port 452 of node 445, provides bi-directional base-band services.

In a third embodiment of the system (see FIG. 5), node 545 is connected to one downstream port of an optical splitter and is used for providing downstream and upstream RF services while an ONU on a different downstream port of the same splitter is used to provide base-band services.

In all three cases, four wavelengths co-exist on the PON between the Hub or central office and the customer premises.

IV. BRIEF DESCRIPTION OF THE DRAWINGS

Exemplary embodiments are illustrated in referenced figures of the drawings. It is intended that the embodiments and figures disclosed herein are to be considered illustrative rather than restrictive.

V. DETAILED DESCRIPTION OF THE EXEMPLARY EMBODIMENTS

Figure 1:
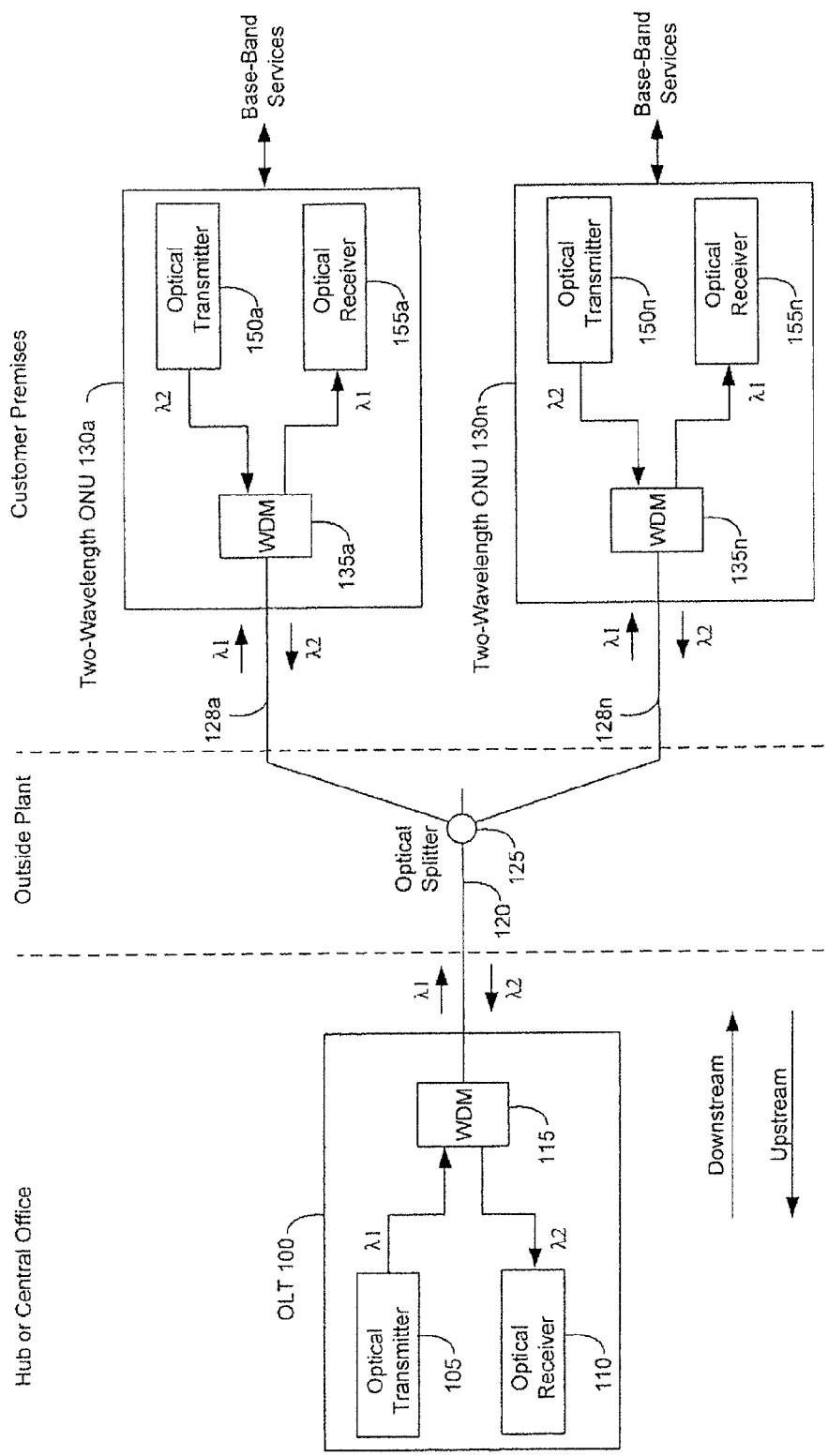
FIG. 1 and FIG. 2 are diagrams illustrating conventional PON systems.

FIG. 1. illustrates a typical PON system comprising an OLT, an optical splitter, and a plurality of ONUs connected to the OLT via the optical splitter. The OLT is generally located in a Hub or Central Office and the ONU is typically located at the customer premise. The customer premise may be a single family home, apartment building, hotel, place of business, or other structure where telecom equipment may be located. The ONU is typically installed inside the home or building or attached to the outside of the home or building.

The OLT 100 typically includes an optical transmitter 105 operating at an optical wavelength $\lambda 1$ and an optical receiver 110 receiving an optical wavelength $\lambda 2$ from a plurality of Two-Wavelength ONUs 130a-130n. In the downstream direction, $\lambda 1$ is multiplexed into optical fiber 120 by WDM 115. It then passes through optical splitter 125, which splits the signal into a plurality of optical fibers 128a-128n. The optical fibers 128a-128n are connected to a plurality of Two-Wavelength ONUs 130a-130n. The ONU comprises a WDM (135a-135n) that de-multiplexes $\lambda 1$ and routes it to optical receiver (155a-155n).

In the upstream direction, ONUs 130a-130n typically include optical transmitters 150a-150n that transmit upstream signals at $\lambda 2$. These signals are multiplexed into fibers 128a-128n by WDMs 135a-135n. These signals then pass through optical splitter 125, optical fiber 120 and are de-multiplexed by WDM 115, and are input into optical receiver 110. The ONUs 130a-130n comprise optical transmitters 150a-150n transmit their signals using a Time Division Multiple Access protocol, where each ONU is assigned a time slot in which it sends its data to the OLT 100. This ensures that multiple ONUs don't transmit upstream at the same time, thus preventing interference at the optical receiver 110.

Figure 2:
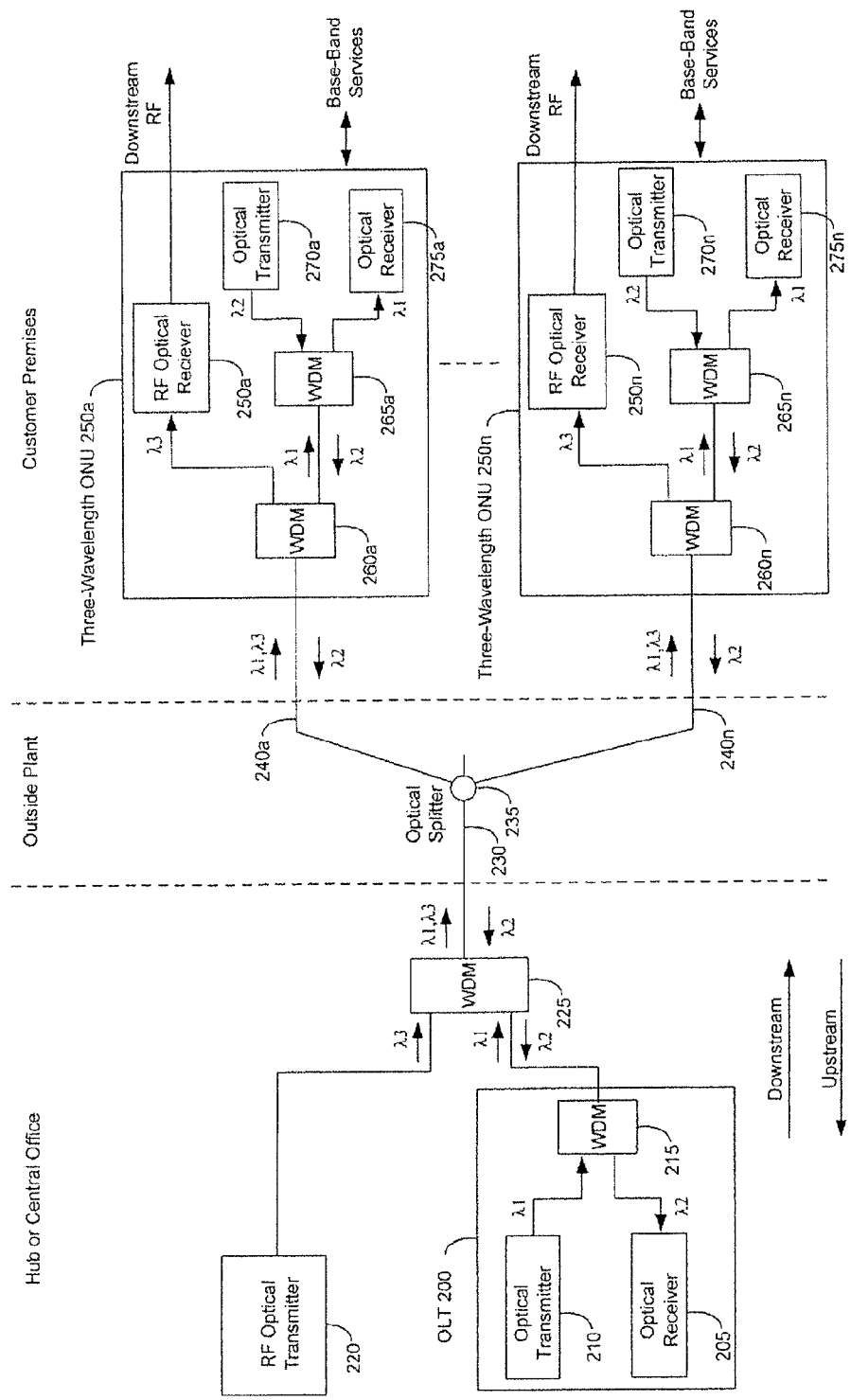

FIG. 2 illustrates a typical PON system as known in prior art comprising an OLT, an RF Optical Transmitter, a WDM, an optical splitter, and a plurality of ONUs connected to the OLT via the optical splitter, where the RF optical transmitter is used to insert RF services into the PON in the downstream direction only. Downstream RF services are modulated by RF Optical Transmitter 220 operating at $\lambda 3$ and multiplexed into the PON by WDM 225. $\lambda 3$ then passes through optical fiber 230, and optical splitter 235, which splits the signal, which is input into a plurality of optical fibers 240a-240n. The optical fibers 240a-240n are connected to a plurality of Three-Wavelength ONUs 250a-250n. The ONUs 250a-250n contain WDMs 260a-260n that de-multiplex $\lambda 3$ and route it to Downstream RF Optical Receivers 250a-250n. The downstream RF Optical Receivers convert $\lambda 3$ back to electrical RF for distribution within the customer premise.

Figure 3:
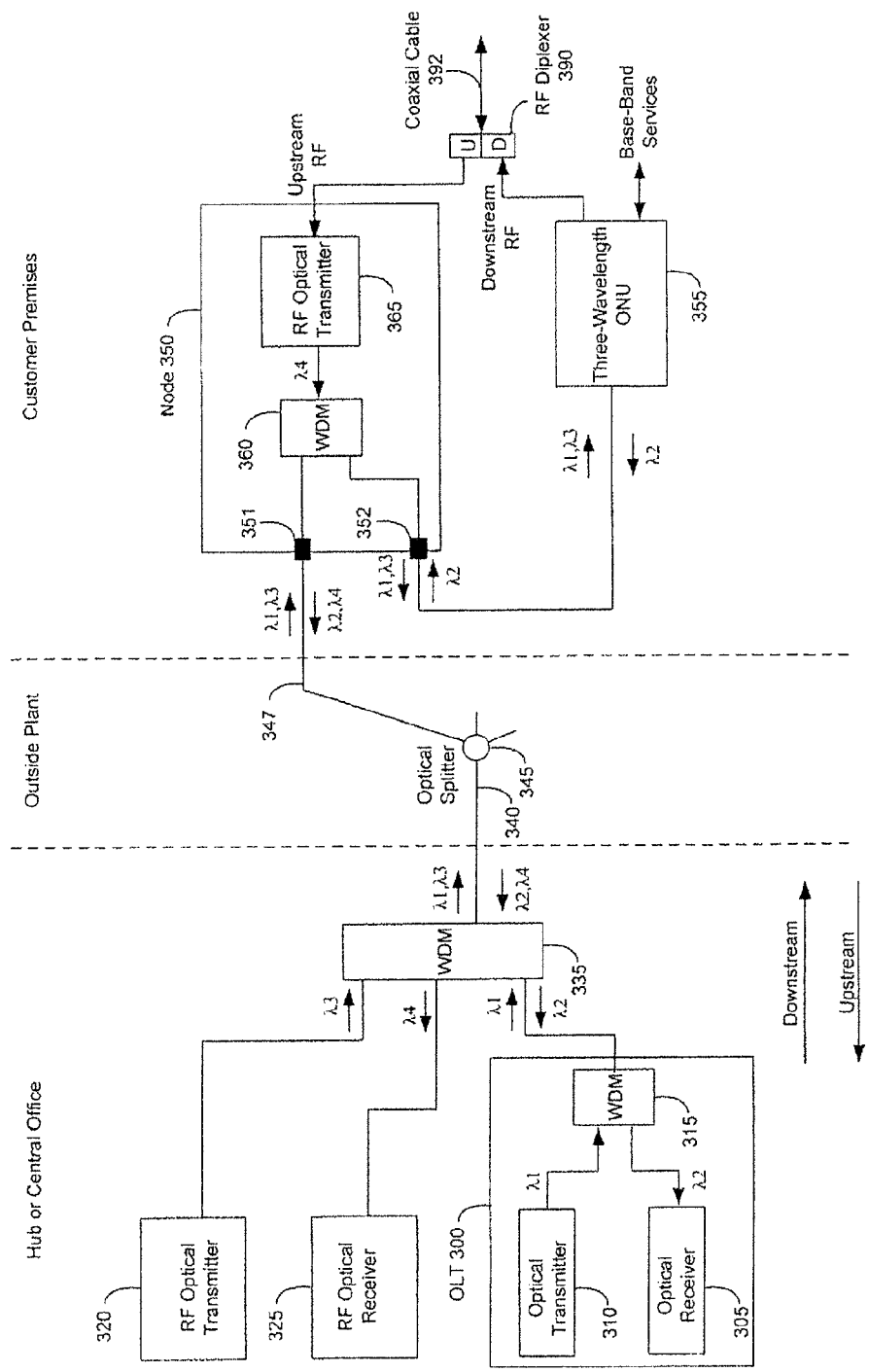
FIG. 3 depicts a PON system in accordance with an embodiment of the disclosures made herein, which utilizes a node with an optical transmitter to transmit upstream RF signals and route other wavelengths associated with the PON to a Three-Wavelength ONU.

FIG. 3 illustrates an embodiment of the invention comprising a node 350 which transmits upstream RF signals at optical wavelength $\lambda 4$. ONU 355 is used to provide base-band services and the downstream RF service. For the sake of clarity, the following definitions will be used:

$\lambda 1$ is the optical wavelength transmitted from OLT 300 in the downstream direction.

$\lambda 2$ is the optical wavelength transmitted by ONU 355 in the upstream direction.

$\lambda 3$ is the optical wavelength transmitted by the Downstream RF Optical Transmitter 320 in the downstream direction.

$\lambda 4$ is the optical wavelength transmitted by node 350 in the upstream direction.

Upstream RF signals from such devices as cable modems or set top boxes travel through coaxial cable 392 and are de-multiplexed from the downstream signals by RF diplexer 390. An RF diplexer is a device that separates RF frequencies. Upstream RF Optical Transmitter 365 modulates these signals into optical wavelength $\lambda 4$. $\lambda 4$ is routed through WDM 360 to port 351 of the node 350, and then to WDM 335 in the hub or central office via optical fiber 347, optical splitter 345 and optical fiber 340. WDM 335 de-multiplexes $\lambda 4$ and routes it to the RF Optical Receiver 325.

Downstream wavelengths $\lambda 1$ and $\lambda 3$ are multiplexed into optical fiber 340 by WDM 335. $\lambda 1$ and $\lambda 3$ are transported to port 351 of node 350 via optical fiber 340, optical splitter 345 and optical fiber 347. Inside node 350, $\lambda 1$ and $\lambda 3$ are routed from port 351 to port 352 by WDM 360. These two wavelengths are then transported to Three-Wavelength ONU 355 which is connected to Port 352 of node 350. The RF output of Three-Wavelength ONU 355 in multiplexed onto coaxial cable 392 via diplexer 390. Coaxial cable 392 is connected to devices such as cable modems and set top boxes or other devices that receive and/or generate RF services. $\lambda 2$ from Three—Wavelength ONU 355 is routed from port 352 to port 351 of node 350 via WDM 360. $\lambda 2$ is then transported to WDM 335 via optical fiber 347, optical splitter 345, and optical fiber 340. WDM 335 de-multiplexes $\lambda 2$ and routes it to OLT 300. It will be appreciated that the exact placement of WDM 360 is not important. For example, WDM 360 could be placed outside node 350 and still provide the same function.

Likewise, it can be placed inside Three Wavelength ONU 355 and still provide the same functionality. Similarly, the node 350 and the diplexer 390 can be placed inside ONU 355 and provide the same functionality. It will also be appreciated that although the various WDMs, optical transmitters and optical receivers are shown as separate devices, they could easily be integrated together. For example, WDM 360 can be combined with the laser of RF Optical Transmitter 365 in a single package. It will also be appreciated that optical splitter 345 is shown as a single device for the sake of clarity. In practice, there can be several 1:n optical splitters connected in cascade. For example, optical splitter 345 can be a single 1:32 splitter or the same function can be performed by a 1:4 splitter connected to four 1:8 splitters.

It will also be appreciated that Optical Splitter 345 doesn't need to be installed for the system to function. Fiber 340 can be connected to port 351 of Node 350 to provide the same functionality.

Figure 4:
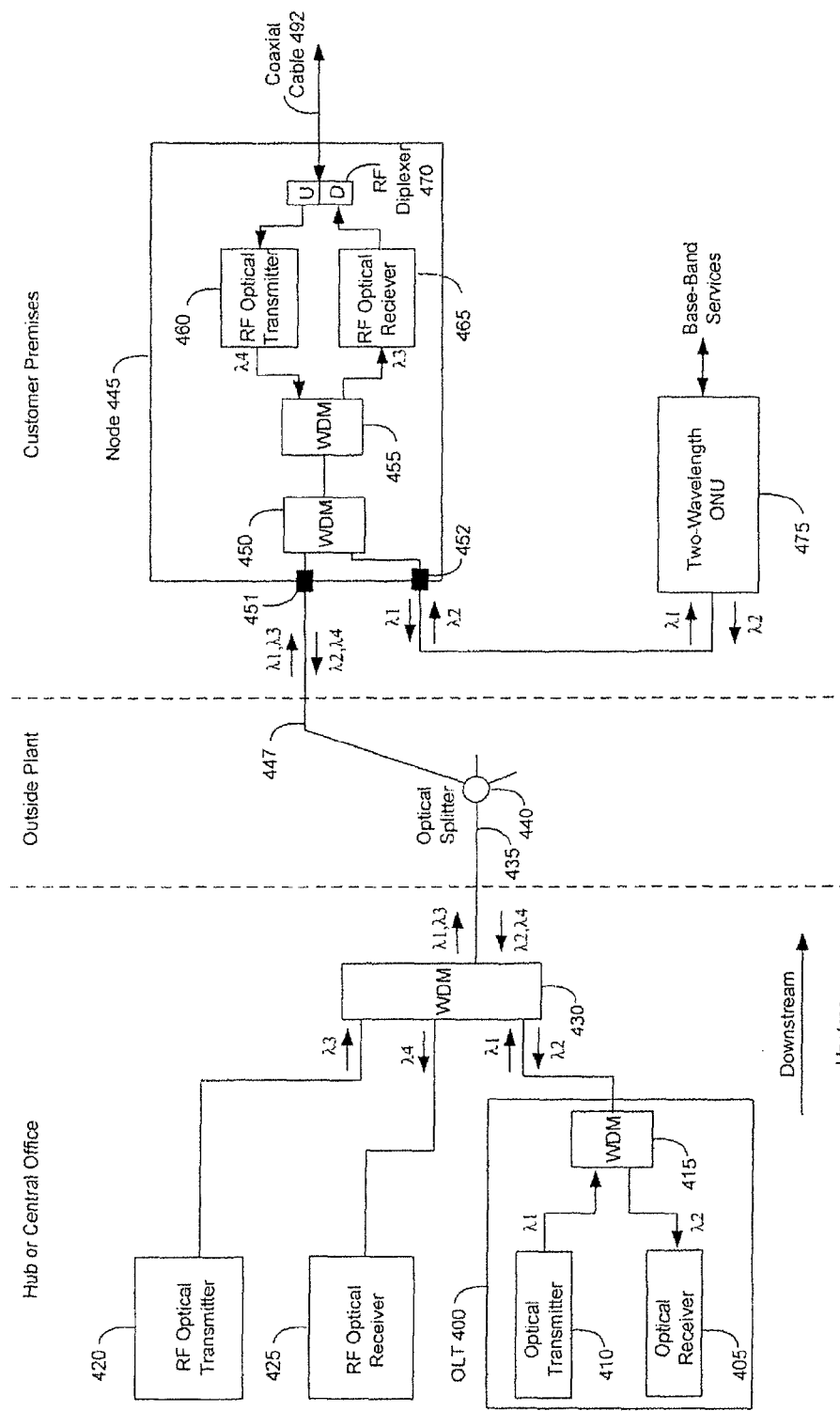
FIG. 4 depicts a PON system in which a node with an optical transmitter and an optical receiver is used to transmit and receive upstream and downstream RF signals while routing other optical signals associated with the PON to a Two-Wavelength ONU.

FIG. 4 illustrates another embodiment of the invention that includes a node 445 that comprises an RF Optical transmitter 460, an RF Optical receiver 465, RF diplexer 470, WDM 450 and WDM 455. Node 445 provides the upstream and downstream RF services while Two—Wavelength ONU 475 provides base-band services.

The two downstream wavelengths $\lambda 1$ and $\lambda 3$ are multiplexed on fiber 435 by WDM 430. They are routed to port 451 of node 445 via optical splitter 440 and optical fiber 447. Inside node 445, WDM 450 routes $\lambda 3$ to WDM 455, which de-multiplexes $\lambda 3$ and routes it to downstream RF optical receiver 465. RF optical receiver 465 converts $\lambda 3$ back into electrical RF and routes it to RF diplexer 470 which multiplexes the downstream RF signals on coaxial cable 492 for distribution within the customer premises.

$\lambda 1$ is routed from port 451 to port 452 of node 445 via WDM 450 and then to Two-Wavelength ONU 475 connected to port 452 of node 445. $\lambda 2$ from Two-Wavelength ONU 475 is routed from port 452 of Node 445 to port 451 of Node 445 via WDM 450.

The upstream RF signals on coaxial cable 492 are de-multiplexed by RF diplexer 470 and routed to upstream RF optical transmitter 460 operating at $\lambda 4$. $\lambda 4$ is then routed to port 451 of node 445 through WDM 455 and WDM 450. From port 451, the two upstream wavelengths $\lambda 2$ and $\lambda 4$ are transported to WDM 430 via fiber 447, optical splitter 440, and optical fiber 435. WDM 430 de-multiplexes $\lambda 2$ and $\lambda 4$ and routes it to OLT 400 and upstream RF optical receiver 425 respectively. RF optical Receiver 425 converts $\lambda 4$ back into RF.

It will be appreciated that upstream and downstream RF services can be provided without installing OLT 400 and Two-Wavelength ONU 475. The system can be deployed with only two wavelengths, $\lambda 3$ and $\lambda 4$ that provide bi-directional RF services. The OLT and the ONU can be added at a later date to increase bandwidth.

Figure 5:
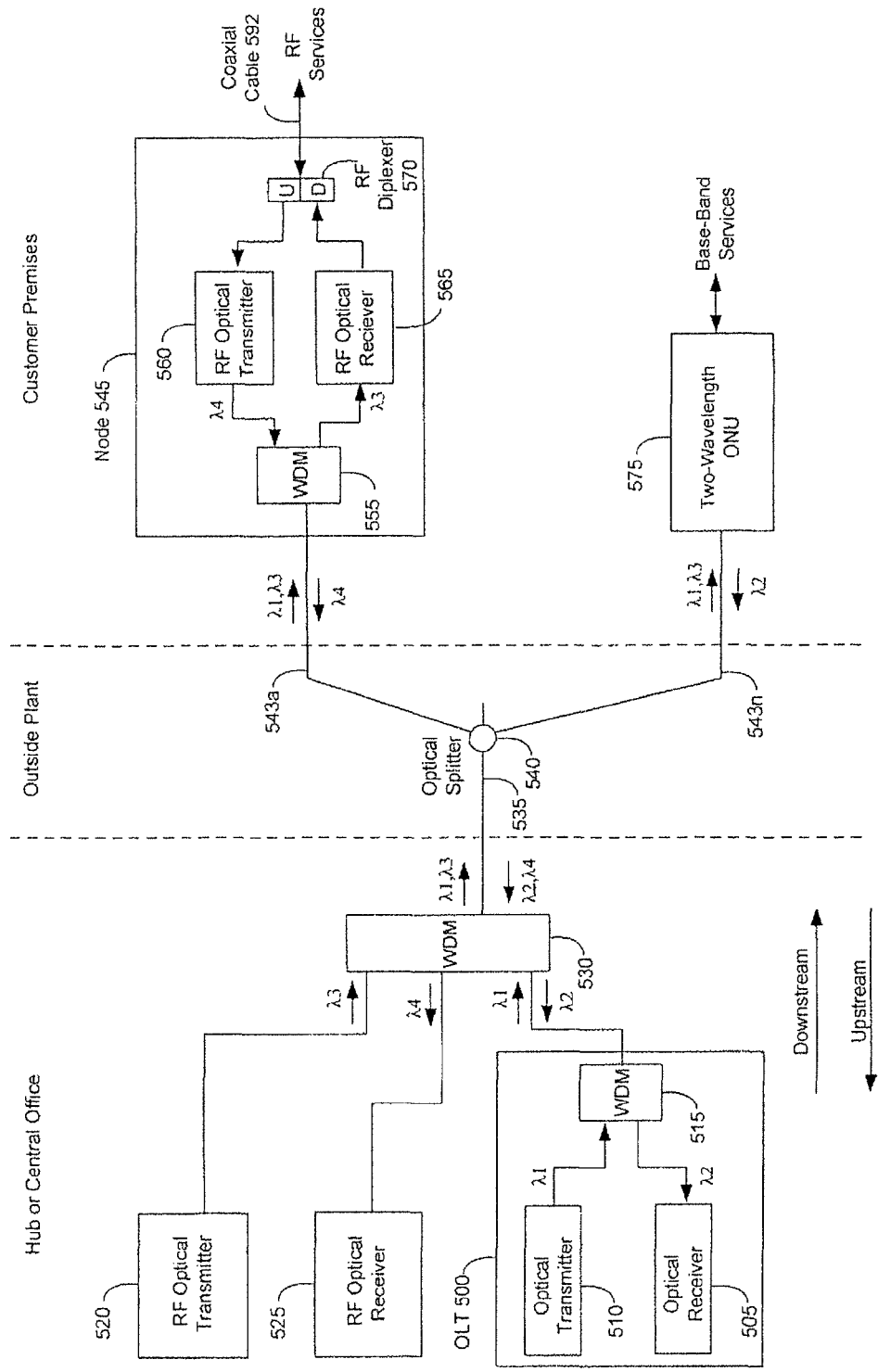
FIG. 5 depicts a PON system in which a node attached to one downstream port of a splitter is used to transmit and receive RF signals while a Two-Wavelength ONU attached to another downstream port of the same splitter is used to receive and transmit base-band services.

FIG. 5 illustrates another embodiment of the invention comprising a node 545 that provides bidirectional RF services and is attached to one port of optical splitter 540. Two-Wavelength ONU 575 attached to another port of optical splitter 540 provides base-band services. $\lambda 3$ transmitted by the RF Optical Transmitter 520 and $\lambda 1$ transmitted by OLT 500 are routed to node 545 via WDM 530, fiber 535, optical splitter 540 and optical fiber 543a. At node 545, WDM 555 routes $\lambda 3$ to RF Optical Receiver 565. The RF output of RF Optical Receiver is multiplexed onto coaxial cable 592 via diplexer 570. Coaxial cable 592 is connected to devices such as cable modems and set top boxes or other devices that receive and/or generate RF services. WDM 555 also prevents $\lambda 1$ from reaching either RF optical transmitter 560 or RF optical receiver 565. This prevents any interference between $\lambda 1$ and the bi-directional RF services provided by node 545.

The upstream RF signals transmitted by devices such as cable modems and set top boxes are de-multiplexed by RF Diplexer 570 and converted into optical wavelength $\lambda 4$ by RF optical transmitter 560. $\lambda 4$ is routed to WDM 530 via WDM 555, optical fiber 543a, optical splitter 540, and optical fiber 535. WDM 530 de-multiplexes $\lambda 4$ and routes it to RF Optical receiver 525.

$\lambda 1$ and $\lambda 3$ multiplexed by WDM 530 are also routed to Two-Wavelength ONU 575 via optical fiber 535, optical splitter 540 and optical fiber 543n. The internal WDM of ONU 575, prevents $\lambda 3$ from interfering with the bi-directional base-band services provided by Two-Wavelength ONU 575.

It will be appreciated that bi-directional RF services can be provided without installing either OLT 500 or ONU 575. Likewise, base-band services can be provided without installing either downstream RF optical transmitter 520, upstream RF optical receiver 525 or node 545.

It will also be appreciated that for the sake of clarity, FIG. 5 only depicts two fibers connected to optical splitter 540. In practice, several fibers can be routed from optical splitter 540 to various homes and businesses. For example, fiber 543a can be routed to a home to provide bi-directional RF services. At the same time, fiber 543n can be routed to a business to provide base-band services. In this manner, several fibers can be routed to different locations to provide either RF or base-band services. All four wavelengths are present on the PON but the device at the customer premise selects only those wavelengths required to deliver the requested services. The other wavelengths are prevented from interfering with the requested services by WDM 555 and/or WDM 580.

Figure 6:
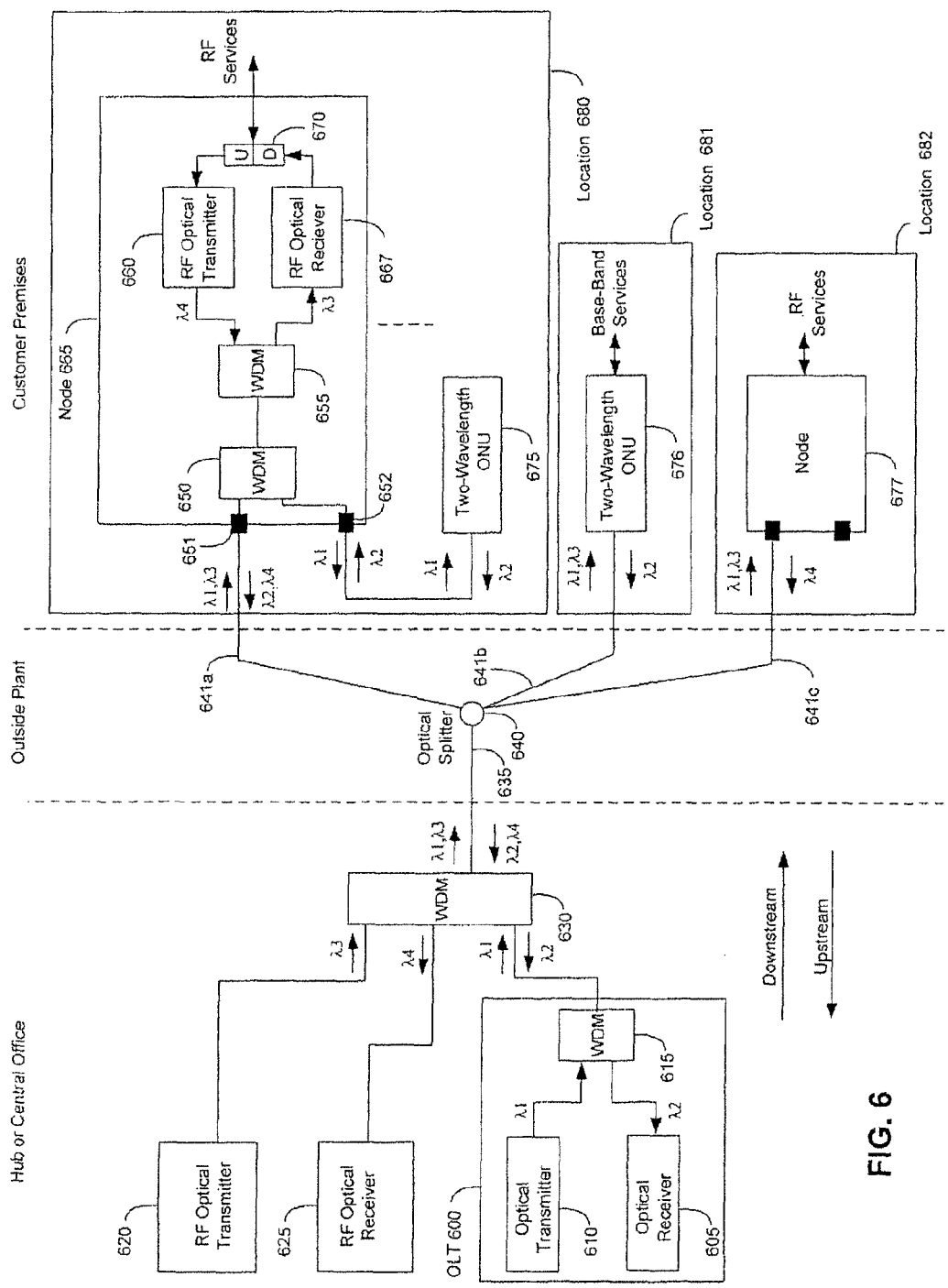
FIG. 6 depicts three locations served by a PON, wherein one location is provided both bi-directional RF services and base-band services, while a second location is provided base-band services, and the third location is provided bi-directional RF services.

Another embodiment of such a system is shown in FIG. 6. Location 680, connected to the PON via optical fiber 641a comprises Two-Wavelength ONU 675 which provides base-band services and node 665 which provide both bi-directional RF services. Location 681, connected to the PON via optical fiber 641b has a Two-wavelength ONU 676 that provides base-band services, while location 682, connected to the PON via optical fiber 641c has node 677 that provides bi-directional RF services. In this manner either bi-directional RF services, base-band services, or a combination of these services can be provided at various locations served by the PON.

We claim:

1. A node, consisting of:
    a first upstream port for coupling to an optical fiber carrying optical signals in a bidirectional passive optical network;
    a second upstream port for coupling a downstream optical signal to an Three-Wavelength Optical Network Unit (ONU) that handles a plurality of wavelengths;
    an RF optical transmitter for receiving an upstream Radio Frequency (RF) signal from a diplexer and transmitting an upstream RF optical signal over the bidirectional passive optical network; and
    a Wavelength-Division-Multiplexer (WDM), coupled to the RF optical transmitter and the first upstream port, operative to multiplex the upstream RF optical signal with other upstream optical signals onto the bidirectional passive optical network.

2. The node of claim 1, wherein the upstream RF optical signal comprises video content.

3. The node of claim 1, wherein the upstream RF optical signal is generated by a set top box.

4. The node of claim 1, wherein the upstream RF optical signal is generated by a cable modem.

5. The node of claim 1, wherein the WDM is coupled to the second upstream port, and wherein the second upstream port is configured to receive an upstream optical signal from the Three-Wavelength ONU.

6. The node of claim 1, wherein the other upstream optical signals include at least an upstream optical signal from the Three-Wavelength ONU.

7. The node of claim 1, wherein the WDM is adapted to route the downstream optical signal from the first upstream port to the second upstream port.

8. The node of claim 5, wherein the WDM is adapted to route the upstream optical signal of the Three-Wavelength ONU from the second upstream port to the first upstream port.

9. The node of claim 1, wherein the upstream RF optical signal and downstream optical signal each comprise video content.

\* \* \* \* \*